UNITED STATES PATENT OFFICE.

KIRK BLAKE, OF LAPORTE, INDIANA.

PROCESS OF CASE-HARDENING STEEL.

1,034,962.  Specification of Letters Patent.  Patented Aug. 6, 1912.

No Drawing.  Application filed March 6, 1912.  Serial No. 682,042.

*To all whom it may concern:*

Be it known that I, KIRK BLAKE, a citizen of the United States, residing at Laporte, in the county of Laporte and State of Indiana, have invented certain new and useful Improvements in Processes of Case-Hardening Steel, of which the following is a specification.

This invention relates to a process of case hardening steel, through the chemical reaction of certain ingredients employed, said reaction being induced by heating the mass to a given temperature and maintaining said temperature for a period of time, and has for its object to render the process more efficient, expeditious and considerably cheaper.

The present method for case hardening steel, say, for instance, line shafts and material of similar character, is to take a number of the shafts and bury them in coarsely ground bone meal, the latter containing a sufficient amount of natural carbon to impart to the steel a case of the desired thickness, when the mass is placed into an oven and brought to and maintained at a temperature of 1750° Fahrenheit for a period of time ranging from 24 to 48 hours. The efficiency of the ground bone meal as a carbon producing medium is greatly impaired after being subjected to the high temperature above noted, and, at present, in order to overcome the money loss that would result from discarding the residue of the bone meal, the same may be used at least once more by adding fresh bone meal, the amount added equaling about one-third of the mass. Adding the new bone meal together with the carbon remaining in the residue of the meal enriches the mass sufficiently to be used a second time. But this rebuilding of the residue of the bone meal cannot be carried on indefinitely from the fact that the prolonged heating readily extracts all the carbon and disintegrates the meal causing it to be reduced to a fine dust with no carbon properties and hence unfit for further use.

The object of the present process is not only to rebuild the bone meal so as to enable it to be used many times but to reduce the time required to produce a case of the desired thickness in about one-half the time now consumed in doing the work.

To accomplish the above result I take bone meal of approximately the same amount as now used for a given job, say 90 pounds of steel; to this I add one-fourth pound of cyanid of potassium; one quart of ammonia and 5 pounds of brown cane sugar, all of which are thoroughly mixed with the bone meal.

With the above mixture I have found by experimentation that I can provide a case of the same relative thickness in one-half the time now required, and can correspondingly increase the thickness of the case by correspondingly lengthening the time of baking.

I claim—

1. The herein described composition of matter, consisting of bone meal, cyanid of potassium, ammonia, and brown cane sugar, substantially as described and for the purposes set forth.

2. The herein described composition of matter for case hardening steel, consisting of bone meal, of an amount sufficient to embed ninety pounds of steel to be case hardened, one-fourth pound of cyanid of potassium, one quart of ammonia, and five pounds of brown cane sugar, substantially as described.

In witness whereof, I, have hereunto set my hand and seal at Indianapolis, Indiana, this, 24 day of February, A. D. one thousand nine hundred and twelve.

KIRK BLAKE. [L.S.]

Witnesses:
F. W. WOERNER,
L. B. WOERNER.